US006970865B1

(12) United States Patent
Plasek et al.

(10) Patent No.: US 6,970,865 B1
(45) Date of Patent: Nov. 29, 2005

(54) DATABASE SEARCHING USING TRAPEZE FETCH

(75) Inventors: James M. Plasek, Shoreview, MN (US); Jennifer J. Smith, Eden Prairie, MN (US); Joseph M. Sandin, New London, MN (US)

(73) Assignee: Unisys Corporation, Blue Bell, PA (US)

( * ) Notice: Subject to any disclaimer, the term of this patent is extended or adjusted under 35 U.S.C. 154(b) by 351 days.

(21) Appl. No.: 10/032,915

(22) Filed: Dec. 28, 2001

(51) Int. Cl.[7] ............................. G06F 17/30; G06F 7/00
(52) U.S. Cl. ............................................. 707/3; 707/6
(58) Field of Search ........................................ 707/6, 3

(56) References Cited

U.S. PATENT DOCUMENTS 5,664,172 A * 9/1997 Antoshenkov ................. 707/4
5,717,919 A * 2/1998 Kodavalla et al. ............. 707/8
5,852,821 A * 12/1998 Chen et al. .................... 707/2
6,374,232 B1 * 4/2002 Dageville et al. ............. 707/2

* cited by examiner

Primary Examiner—Uyen Le
Assistant Examiner—Cheryl Fernandes
(74) Attorney, Agent, or Firm—Lise A. Rode; Mark T. Starr

(57) ABSTRACT

A method and apparatus for improving search performance in databases organized in B Tree or B+ Tree format has an automatic determination and switching between two methods. It also searches to the end of a current leaf page even if a current value for all key parameters has been fulfilled in the search prior to reaching the end of the current leaf page. Swinging across and thus skipping leaf pages to fetch a next leaf page (trapeze fetching or swinging) is activated only either initially or where a B Tree search has resulted in a skipping of leaf pages previously in a search. User interference with the automatic selection of search type between next sequential leaf or trapeze type is not provided for and not allowed.

9 Claims, 6 Drawing Sheets

TABLE NAME: SPORTEVENTS

| | EVENT_DATE (P.K.) | EVENT_TYPE (P.K.) | EVENT_NAME (P.K.) |
|---|---|---|---|
| 1. | 2001-03-03 | BASKETBALL | LAKERS |
| 2. | 2001-03-03 | RUNNING | GRANDMAS FLORIDA |
| 3. | 2001-03-03 | RUNNING | HAWAII 50 |
| 4. | 2001-03-03 | RUNNING | TURTLEMAN |
| 5. | 2001-03-03 | SWIMMING | TURTLEMAN |
| | 25,000 MORE RECORDS WITH EVENT_DATE 20010303 | | |
| 6. | 2001-03-03 | WATER SKIING | CYPRESS GARDENS |
| 7. | 2001-03-04 | BASKETBALL | AIRDAYS 3 ON 3 |
| | 4,000 MORE RECORDS WITH EVENT_DATE 20010304 | | |
| 8. | 2001-03-04 | RUNNING | RIVER FALLS MARATHON |
| 9. | 2001-03-04 | RUNNING | RUN FOR THE ROSES |
| 10. | 2001-03-04 | RUNNING | TINMAN RUN |
| 11. | 2001-03-04 | TENNIS | BENSON OPEN |
| 12. | 2001-03-04 | TENNIS | MYHRE OPEN |
| | 99,999 MORE RECORDS WITH EVENT_DATE 20010304 | | |
| 13. | 2001-03-04 | WATER SKIING | LITTLE CROW SKI SHOW |

DATABASE SEARCHING USING TRAPEZE FETCH

BACKGROUND OF THE INVENTION

1. Field of the Invention

This invention relates to the field of database searching and is particularly applicable to enhanced searches in B Tree and B+ Tree database structures having at least two primary key columns, and wherein at least one of those key column's search values is specified by range.

2. Background Information

Searching through large databases for records that fall within a range of one key column value while requiring a match on another key is a problem that has had various solutions in the past, all of which have had some trade-off requirements related to efficiency. These searches in B+ Trees and B Trees (fairly common forms of database record structures) are very compute and I/O intensive in large databases. This is because many pages need to be brought into memory and searched in order to produce a complete answer to the query. While in some situations a partial answer may suffice, getting to that partial answer may be problematic also.

In the B+ Tree structure, at least one level of index pages exists which contains only keys pointing to records, and there is also at least one root index page containing keys. At the leaf level, pages of memory exist having the rest of each of the records stored therein and these are called leaf pages. Each leaf, which usually contains a number of records, generally also has a way to identify a next-sequential leaf page. Thus the last record in a leaf page may "point" (or the leaf page may have a pointer that points) to the first record of the next-sequential leaf page. There are many ways the next sequential page can be identified. Most commonly, a next page number, from which a next page address can be computed, is included in the current page in a location that can be read by a program accessing the leaf page. The index pages will contain locators, which point or otherwise provide an accessibility route to the leaf pages through the key values that they maintain. Because of these locators, one can search through the indexes to find a leaf that contains a record having the key(s) for which one is searching. The indexes' and the leaves' records are ordered, preferably in ascending order, although one could apply the principles described herein to descending order database organizations, or database organizations having a combination of ascending and descending ordered key and/or record values as well. This patent only discusses the databases having all data organized in ascending order, however, to reduce the complexity of the explanation of the invention, but one could apply the teachings here to any of the above-mentioned organization forms of database records and keys if desired.

It should also be noted that the invention can be applied to B Tree and is B+ Tree database structures, but the preferred embodiment was developed for B+ Tree structures.

Where a database contains many thousands of records and thousands of leaf pages, the Input/Output time required for each search through the records of a page slows down the performance time for the search. Where multiple index pages are used and these too must be fetched to be swapped in and out of main memory, additional time costs are imposed for each B+ Tree search requiring a reference to the index pages in order to determine the next page to fetch.

Accordingly, any procedure which optimizes the number of searched pages needed to accomplish a database query would be valuable.

The inventors have found a method, which provides superior performance for searching databases where the search has a range given for a first key column and at least a second key column value of interest to the search query.

While a user could specify parts of the range to skip, or provide other hints to the search engine if the user has direct control over it, in current networked systems, particularly using ODBC, JDBC, or other Java set-ups to communicate a query to a database program, the user is not allowed to program the specific hints about using just part of a key column. Therefore, automaticity in operating the search in an intelligent manner would be very helpful. (A "hint" in this context is a way of using a proprietary syntax to suggest a directing input from within the query. The proprietary database controller would use the hint to specify a directed limitation to the search query form, based on the hints in the appropriate syntax, given by the user.)

What existed in the past for doing B+ Tree searches of the specified complexity includes at least the List Search Key method provided by Unisys Corporation, the assignee of the instant patent, but which is not well documented in relevant aspects. However, this List Search Key method appears to be quite similar to a portion of the MDAM™ system provided more recently by Compaq Computer Corporation; and described on their website as of the time of the filing of this document and which is also, apparently, the subject of U.S. Pat. No. 5,778,354 issued to Leslie et al.

The MDAM search system, if operating on two keys, say a K1 And a K2 key, would exercise two methods for getting a next consecutive K1 value where a range of K1 values is specified in the search query, these methods determining whether the data qualifies as sparse or dense, and then doing the search for a next page to fetch in accord with the indicated data quality. This can be costly overhead and thus compromise search performance since there is no automatic way to turn this testing exercise off. Another deficiency in the MDAM search system is that if a range is specified, the prior art (including the "list search" by Unisys) would perform complete searches of all the key values for the key column range. This often will mean bringing extra leaf pages into memory and searching them even though the extra searching is not necessary.

There is a provision in the MDAM search system to allow for user specified de-selection of particular key column values, but there is no automatic way to de-select key column values. Also, because of limitations in available command communications for many ODBC and JDBC installations, even these user-directed de-selection of parts of a key range will not be available to optimize many searches. Further, if the user is not appropriately skilled in his knowledge of the data within the database, user-directed range modifications may actually hurt performance or a poorly crafted user directed query can even cause a miss of some records needed for an intended query. At a lesser level than a directed query, a user can provide hints within proprietary syntax to assist an MDAM query to function more efficiently, but such hints are not accepted in the SQL. Even if the proprietary "hint" syntax is available, such hints if in artfully contrived may cause a search to run slower than optimal, or even slower than the system would run it without the hints, depending on the skill of the user's formulation of hints.

Also, the MDAM search does not allow for moving to search for a next key column value when all the records for the second key have been located within a page for a first key value. Instead, MDAM automatically may force a new fetch and reloading of a current leaf page, since it discontinues searching on that page when it finds the last record for the second key at a given primary key column value.

There have been other attempts to improve performance of B Tree database searches, including, for example, a partial indexing scheme using an optimizer described by Sartori and Scalar in *Partial Indexing for Nonuniform Data Distributions in Relational DBMS's*, published in IEEE Transactions on Knowledge and Data Engineering, Vol 6. No. 3, June 1994. The overhead associated with such a method however, that is, establishing new indexes and maintaining them in partial form, may not be an acceptable part of a viable solution for many users.

Accordingly there is still a need for more effective and/or alternative search methods where a range will be specified for a key value in a multi-key search query, and one which provides automatic performance enhancement by operating multiple search strategies at appropriate times, given a variable or unknown data distribution.

BRIEF DESCRIPTION OF THE DRAWINGS

FIG. 4 is a chart of illustrative events in a database.

SUMMARY OF THE INVENTION

A B+ and B Tree database search method is described that provides automatic skipping of pages of the database record identified by key(s) when a user search query specifies a range for one key and a value for a second key range. This can be used with any number of keys if desired, provided the method and system operates on the range of key values first for one of the keys specified in the search and has a specified value for a second key. Preferably the key specified by range will be the lead-most (or first relevant) key column to take greatest advantage of this invention. Generally, the closer to the leading-most key column is used as the key where the search specifies a range, and the larger the record set within each distinct value of the key's range, the more likely our invention is to enhance performance. In other words, the more pages available to swing past, the greater the enhanced performance will be. The method also automatically chooses between providing leaf page to leaf page fetching (called sequential or sometimes right-leaf fetching) where appropriate to enhance search performance, or B Tree skipping searches, swinging past unneeded pages where that form of next page processing is more efficacious. This switching between methods can be based on the results of the record-by-record search performed on one or more leaf pages previously obtained within the query response, or on results from recent previous searches as well.

Also, the invention preferably completes record-by-record search of a current leaf page even when a last key value in a range of key values has already been found, prior to searching the records through to the end of the current leaf page. This counter-intuitive completion of searching in a current page after completion of searching in a current page for a given pair of key value records actually improves performance in two ways. If a record within the page produces a record having a second key value from within the key value having a range specified in the query, it will have already been found. If the end of this second range value is found within the page before the last record is reached, it is still possible that a B Tree search to check the index for the next key range value pointing to a page which may not be next-sequential will provide the opportunity to skip a page or more. If the last record within a page matches the first and second key values, the next-sequential leaf page fetch is appropriate as well, since the key range specified has not been fulfilled and we do not know if all records for this pair of key values has been found.

DETAILED DESCRIPTION OF THE PREFERRED EMBODIMENTS

Figure 1:
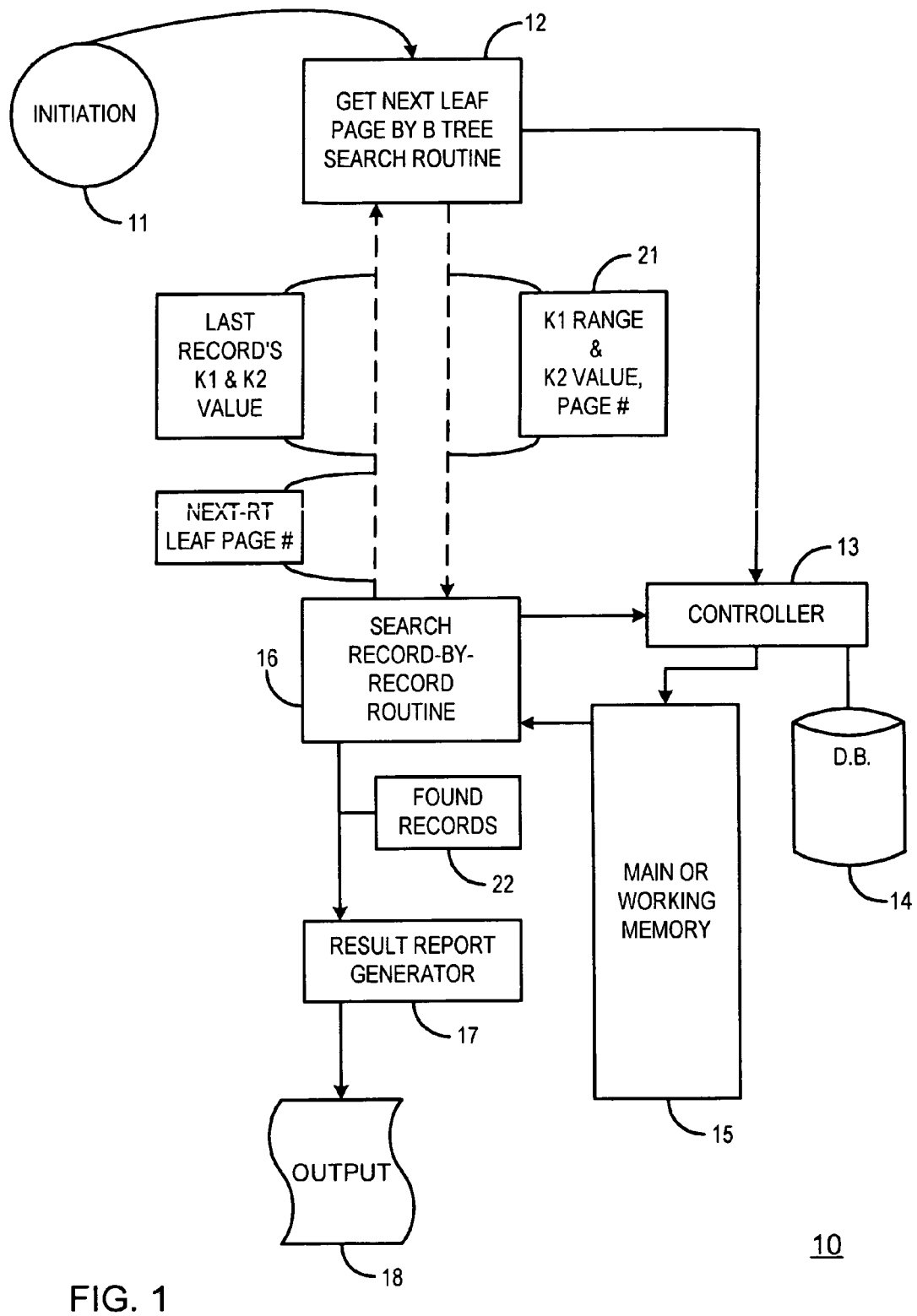
FIG. 1 is a heuristic block diagram outlining the components of a system for implementing the preferred embodiment methods.

The general workings of the invention as presently preferred may be described with reference to FIG. 1, consisting of a heuristic block diagram 10 of the inventive components operating within a computer system. The Main or working memory 15 will be used by the various routines for holding record and index data and accessing and using it. The data becomes available to the main memory though a controller 13 which may be directed by various processes within the computer system. For the purposes of this invention, by either the search record-by-record routine 16 or by the get next leaf page by B Tree search routine 12 can access the main memory, but it is convenient to assume that the get next leaf page routine 12 communicates the commands to get the next page needed to search and that the search record-by-record routine accesses the main memory data. In the presently most preferred embodiment, the get next leaf page actually accesses the main memory containing leaf page data to get the next-sequential leaf page number, but we illustrate this in FIG. 1 with the search record-by-record routine getting this information and passing it to the next leaf page search routine for parsimony and clarity. The data records themselves are most likely stored in a long-term storage device 14, having a database organization to them D.B. This invention is particularly adapted to function with B+ Tree database organizations, and may not operate effectively with other forms. Particularly, the records need to be organized into a serial order in leaf pages and the leaf pages need to be pointed to by index pages.

The inventive system will function at the instance of an initiation routine 11, which may be responsive to a user-directed database inquiry. This routine will perform any housekeeping functions, security, and the like to prepare the system to accept the query. The next leaf page to be sought once the program has been called will be decided by the routine in block 12, which will direct that the next leaf page be gotten through the devices of the controller 13 and the memory device 14 and placed into the main memory 15.

Intermediate to getting a next leaf page, the routine 12 must determine, based upon the query, which leaf page is next. (As mentioned previously, this explanation assumes that the ordering of all records, indexes and key columns is ascending. However, this explanation will be sufficient for one of ordinary skill to adapt this explanation to descending ordered records, indexes or key columns. A highly skilled person may also adapt this easily to mixed-order records where some key columns are ascending and some descending in order of arrangement. The basic concepts here may be applied to all such arrangements). To determine which page is next, the query's first key (K1)'s lowest value is determined first. If for example, the K1 key range for the search query is "less than or equal to 30," the lowest value would be zero. (Of course, if the data in the database permits zero as a key value, or if not, then one, assuming cardinal numbering, or, if the lowest number possible value is negative, then the highest negative number is the first number selected as the value). For another example, using a key column such as a key column having alphabetically listed names; those which began with the letter "A", would be first if the range specified for the search was, "less than "R"'.

For the second and each subsequent get-next-page iteration, the routine 12 would have the results of the previous search and be using the next consecutive value for the K1 range at which to start, that is, to identify the leaf page. The next leaf page would be found using the index page full of K1 values, based on the index page having that next consecutive K1 value in the K1 range. However, this process of going to a next consecutive K1 value does not take place until the K2 value has been exhausted (all records with the K2 value found) for the current K1 value. Prior to that, the next consecutive leaf page will be used; presuming the search by records has not exhausted the K2 value for this current value of the K1 range.

Thus, using the simple example of alphabetic names organized by last name first like a telephone book, a search query specifying all the "Johns, having a last name that begins with B" (i.e., all the K2 value=John; K1 value=Baaaaa . . . Bzzzzz) may be fine, assuming the key indexes have multiple B's in them, such as Badman, Banner, Benson, Breitle, Brong, and the like as K1 key values in a putative index page. In such an example, the range requirement would be met because there is a range of B name values. Thus, if the search has found a last John in the Badman K1 value, and it was not the last record on the leaf page being searched, the routine 12 will update the K1 value to Banner, because Banner is the next consecutive K1 value. (The record-by-record search routine 16 will have searched the leaf page(s) for the last record with Badman in the K1 value and then searched the rest of the page for the next K1 value having John as a K2 value). In either event, the routine 12 will check the index page(s) to see if there is a John in the K2 key column having a K1 value Banner (unless the record-by-record search has already exhausted the Banner values in the current leaf page). (Routine 12 may do this using the record-by-record search routine to search through the index page or have a similar routine of its own. Either form is acceptable). If there is no John Banner, it will go to the next B name found, Benson, then proceed to check the Benson Key values for a John. If one is found the routine will obtain the leaf page indicated by the Benson:John K1:K2 entry in the index. The index may not be dense, so it may just have a Benson, John so the closest leaf page will be returned and searched by routine 16. Generally, once the routine 12 has determined which leaf page to fetch to load into the main memory, it will call it through whatever controller 13 the computer system has so that it gets from the database D.B. into the main memory 15. Further detail on the functioning of the routine 12 and the record-by-record search routine 16 appears with reference to the flowchart illustrated in FIG. 5.

The Search record-by-record routine 16 generally operates using the main memory 15 to get each record and examine it for the qualities specified by the search query, which may have been narrowed by the get next leaf page routine 12. The found records 22 with such qualities will be indicated to the result report generator 17 which will provide appropriate output 18 to the user.

Figure 2A:
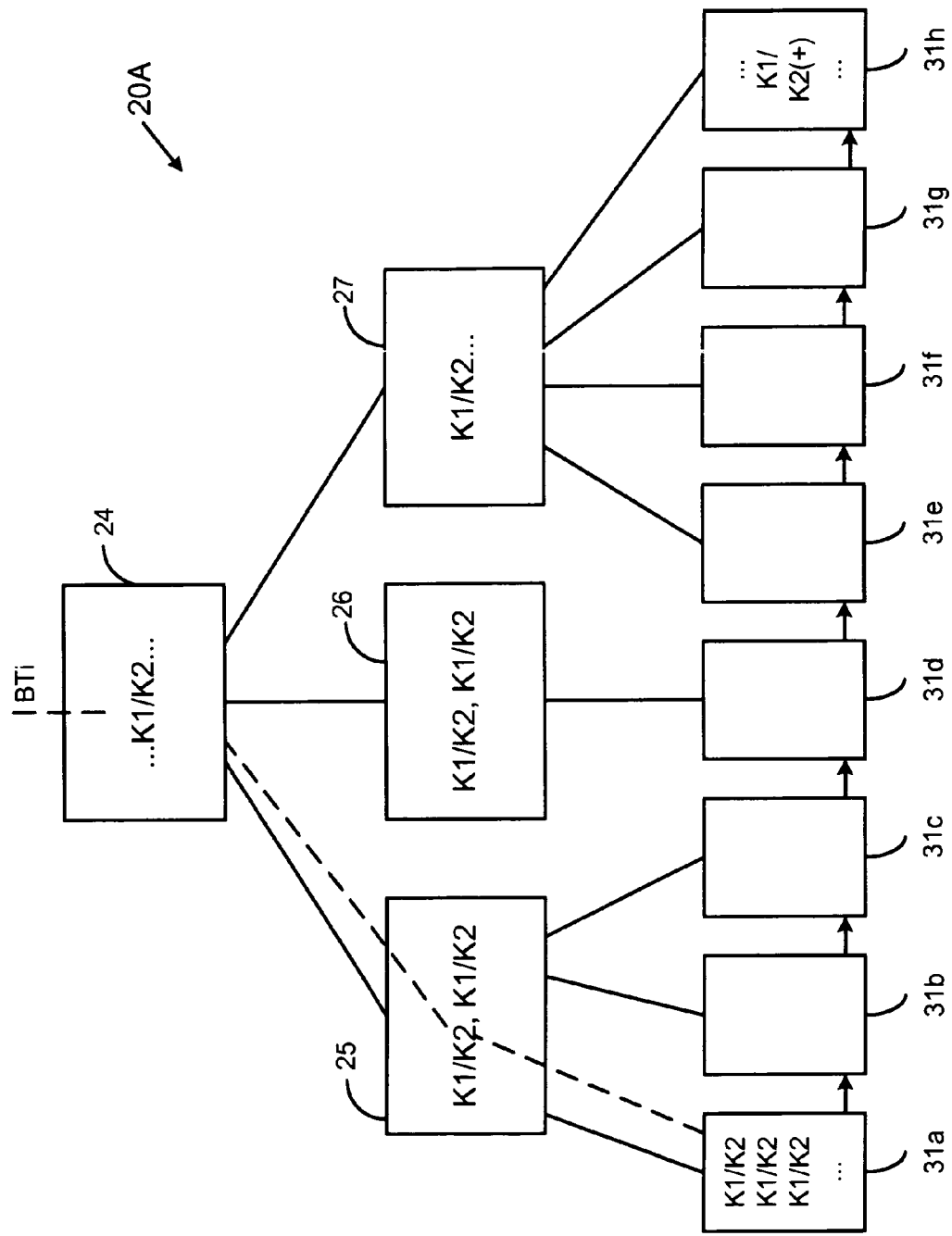
FIG. 2A is a block diagram of a set of pages including index pages and leaf pages in a B+ Tree database.
Figure 2B:
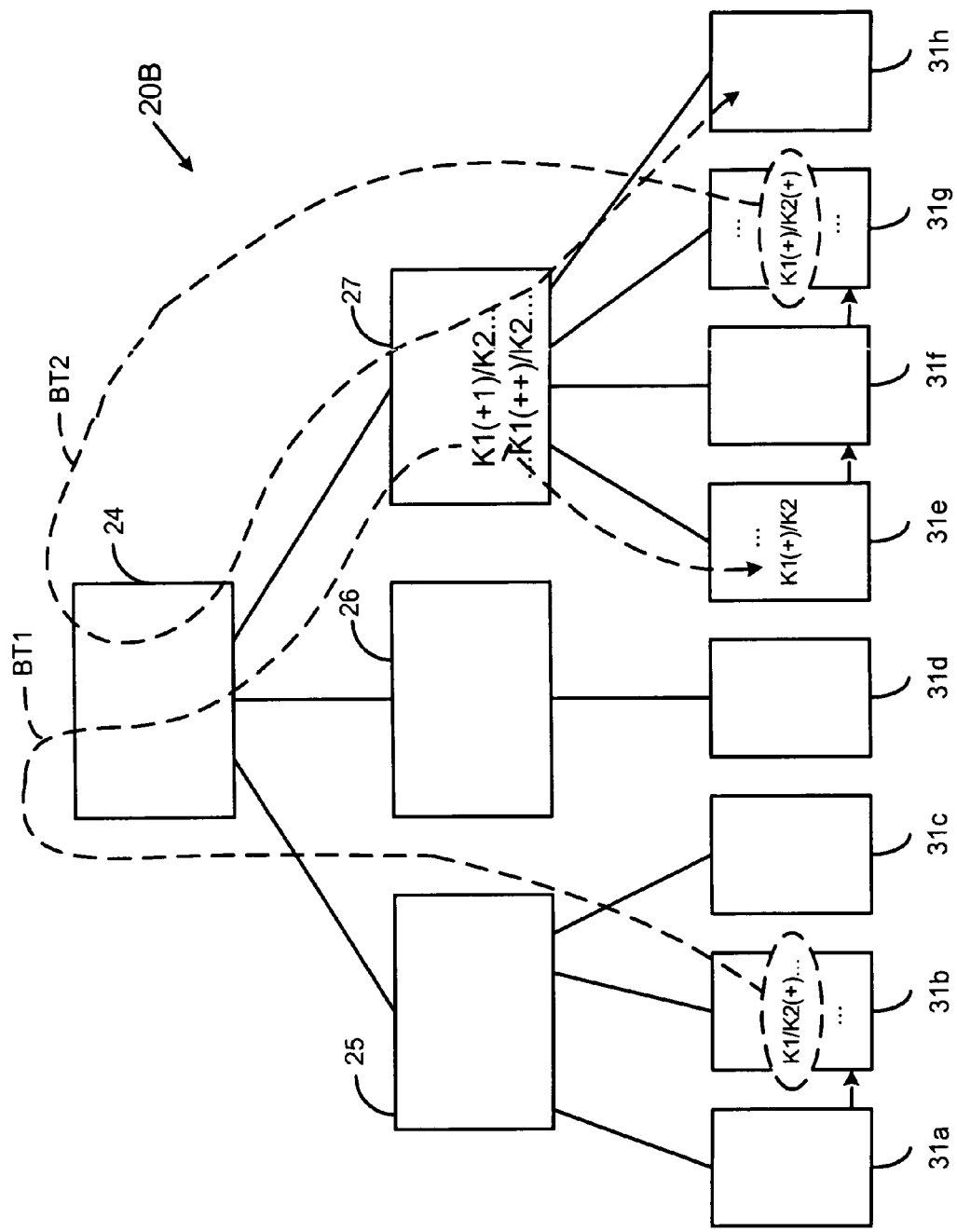
FIG. 2B is a block diagram of a set of pages including index pages and leaf pages in a B+ Tree database illustrating a different order of search execution than the order illustrated in FIG. 2A.

Assuming for the purposes of explanation that the routines 12 and 16 function independently, information such as the one of a current last leaf page's last record's K1 and K2 values need to be available from the routine 16 to the routine 12 as well as the next sequential leaf page number in order for routine 12 to always know which next leaf page to get into the main memory. The current values of the K1 and K2 keys as well as the K1 range and current page number need to be made available to routine 16 form routine 12. Referring to FIGS. 2A and 2B, a database 20A/B is illustrated twice. The dotted line in FIG. 2B illustrates a "trapeze fetch" shown skipping leaf pages to get to the appropriate leaf page. The sequential-leaf search is shown in FIG. 2A, by the arrows that connect the leaf pages 31*a–h*. This kind of search takes advantage of the fact that the last record in each leaf page will contain a page number or other link to the next leaf page, and the computer system can load that page in based on the link. The start of a search which requires a range of k1/k2 key column values found in the index pages 24 and sub index pages 25, 26 and 27 will follow the initial B Tree search line BT*i* to the first value satisfying a fixed value that is part of the search query. When the last record on leaf page 31*a* is reached, the sequential-leaf searching will begin and continue through leaf pages 31*b–h*. In leaf page 31*h*, for the purposes of this example, we assume that a secondary key column value in a record within that page has a second key column value K2(+), which is greater than the query value for K2. In this case, the inventive search algorithm will search the rest of the records on that page 31*h*, instead of trying a B Tree search to locate a next page with a next consecutive K1 value in the K1 value range. By continuing to complete searching a leaf page already loaded in memory, this algorithm avoids having to relocate and possibly also later reload that same leaf page in instances where a next key column value in the K1 value range asked for in the query is present later in that same page.

FIG. 2B illustrates the B tree search in the same database here called 20B. The search is initiated in leaf page 31*a* as before, but here in page 31*b*, a record is found that is greater than the K2 value specified in the search. This prompts the search record-by-record routine (16 from FIG. 1) to let the get next leaf page routine (12 from FIG. 1) operate to get the next leaf page that has a K1 value within the range. However, as mentioned previously, the rest of the page the record-by-record search routine is on will be searched before reporting to the get next leaf page routing so that if another K1 value is searched and completed in this current page, the get next leaf routine can move to the next subsequent K1 value in the specified search range. In the illustration of FIG. 2B, the B Tree search BT1 specifies a value k1(+)/k2, which first appears in leaf page 31*e* as indicated by index page 27. A next sequential leaf page search is subsequently conducted until in leaf page 31*g*, a value of the second key column is out of range (K2(+)), requiring as per the inventive algorithm another call to the get next leaf page routine, AFTER the end of page 31*g* is searched. Here, this loops the search into leaf page 31*h*, through the same index page 27 where a value K1 (++)/K2 will be obtained for a record in that leaf page.

Figure 3:
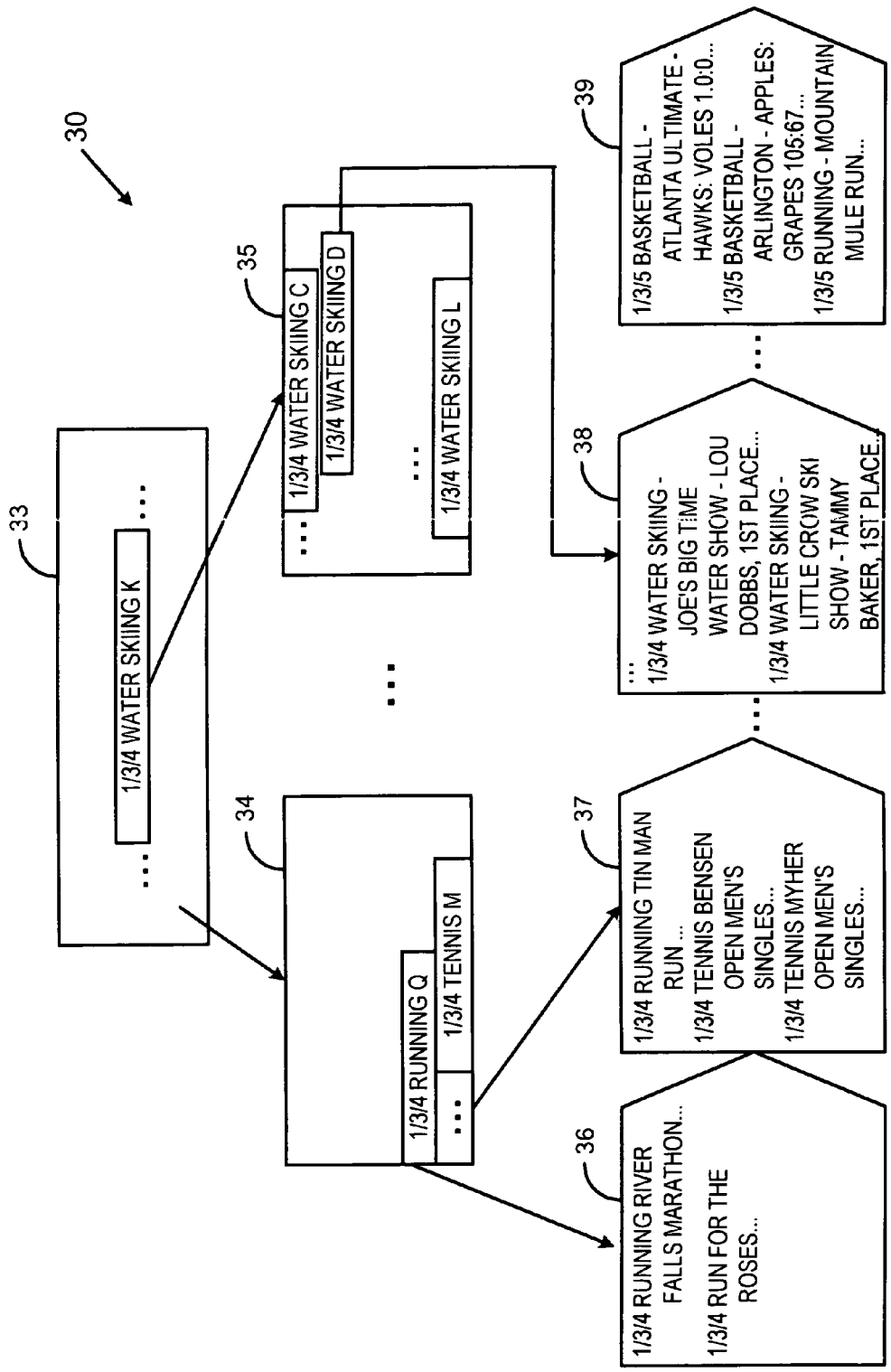
FIG. 3 is a flow chart illustrating a part of the trapeze fetch process.

FIGS. 3 and 4 should be read together, and describe this process again in the context of pseudo-real data. Here the database 30 corresponds to the table 40. The primary key (equivalent to K1 of the previous examples) is an event type, and the second primary key is an event type. The name of the event is an unused third primary key. Typically, there may be several more columns in the leaf pages indicating score, lap times, participant's names and the like, which will show up in the leaf pages but not in the indexes. In FIG. 3 the database 30 has at least one primary index 33 and at least two secondary index pages 34 and 35, and several leaf pages, here 36–39. In the index pages each value points to a last lower page having that value in it. Thus, index page 33 has 2001-03-04-Water Skiing K . . . pointing to the index page where that set of values would be located if they exist, and a previous pointer to a previous index page 34. The index page 35 points to the leaf page 38 since it has records surrounding that set of key column values 2001-03-04-Water Skiing-Joe's . . . /2001-03-04-Water Skiing-Little Crow . . . .

Refer again to FIG. 4. This table consists of 1,029,012 data records, each with three columns:
event_date, which is the date of the event
event_type, which is the specific type of event it was
event_name, which is the name given to the event The primary keys for this table is a composite key containing all three columns, which means that all three columns are required to get a unique value for a row of data.

For a query that wants to find all 'Running' events over a certain period of dates, the first key column would be specified using a range operator such as greater than, less than, or BETWEEN and the second key column would be specified with an "=". The third key column would not be included in the query. An example query would be as follows:
SELECT*FROM SportEvents WHERE event_date>=date'2001-03-03' AND event_type='Running';

Since there may be hundreds or thousands of data pages between matching records over this range of dates, using the sequential link to get the next leaf page (which we call "Page Link Fetch") causes the database management system to look at many orders of magnitude too many records. In this situation, this invention will do a swing as described in the steps below. Again, it is assumed that execution starts using Method 1 to find the first record to be returned, i.e., record #2:

1. Return records #2, #3, and #4 because they match the search criteria. (At this point the invention decides to swing using a decision process to be described later.)
2. The inventive Trapeze Fetch recognizes that record #4 is the last in the range where event_date=date'2001-03-03'. It will go to the end of the current leaf page and then go to the next process step.
3. Determine the next value of event_date by performing a search of the B⁺-tree looking for the last record where event_date=date'2001-03-03'. This is record # 6. The next record (#7) has the next value of event_date, which is date'2001-03-04'.
4. Swing to the next value of event_date by performing a search of the B⁺-tree looking for the first record where event_date=date'2001-03-04' and event_type='Running'. This is record #8.
5. Return records from this new position as done in step 1.

Figure 5:
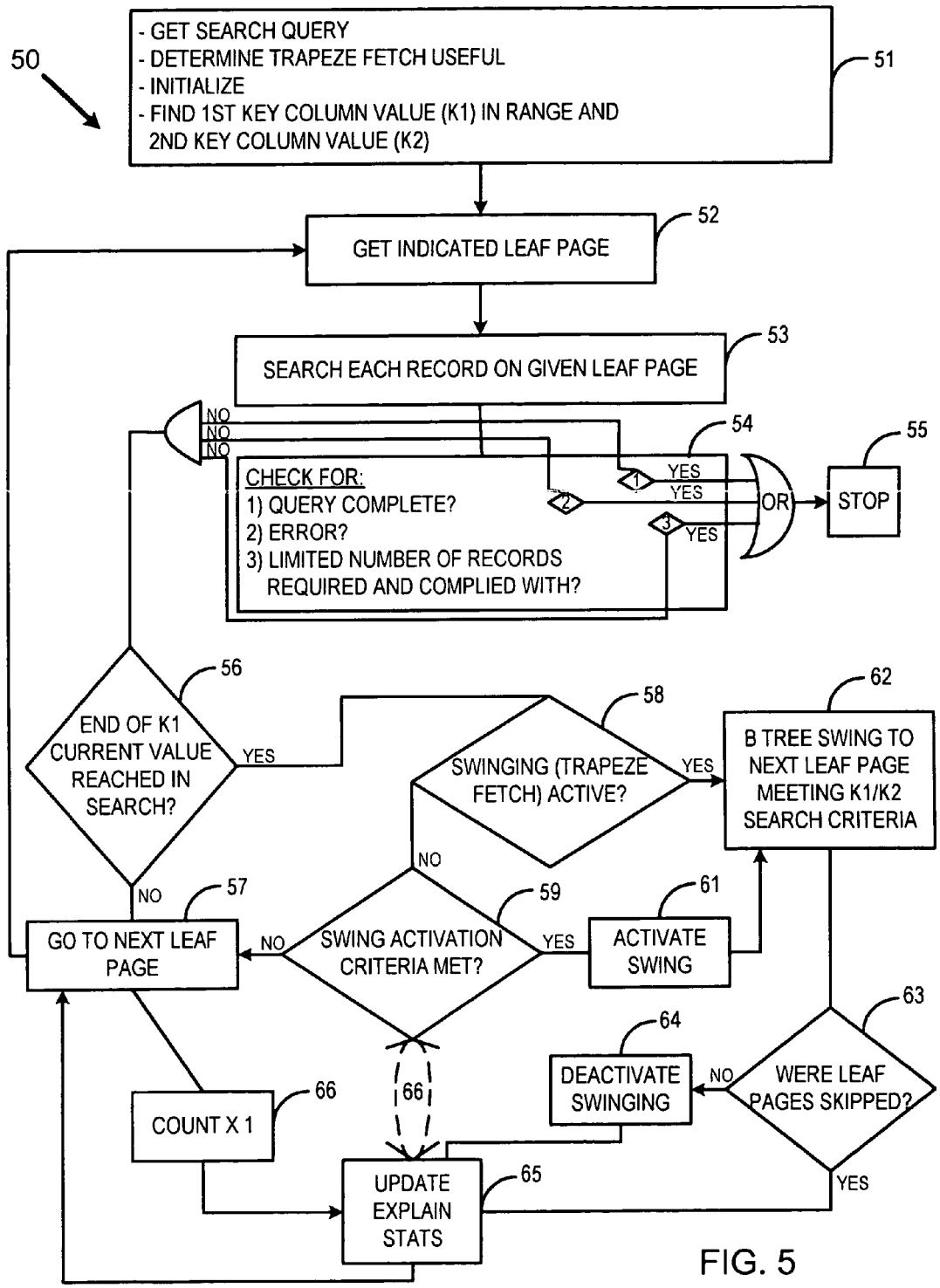
FIG. 5 is block diagram of a portion of a B+ Tree organized database for holding the illustrative records of FIG. 4.

In FIG. 5 is a flow chart outlining the process steps 50 in another manner. When the process 50 first gets the query in step 51 it determines at the outset if a Trapeze fetch process is appropriate based on the search criteria. If there is no primary key that has a range of values, the Trapeze fetch search will not benefit the search and normal processing can be invoked. Any initialization that may be required can be performed. The first value in the range in a primary key is extracted from the search query, as is the fixed value in another primary key from the search criteria specified by the user. As mentioned previously we assume for this explanation all records and key column values are arranged in ascending serial order and it should also be noted that some values may not appear in that order in the records. Thus, a range of values from 1–10 may include values of 1 and 10 or not, depending on the way the search query is phrased, and the first step is to understand that query. In any event, the lowest value available in the first primary key (K1) range will be the one initiating the first B Tree search together with the fixed value for the other primary key (K2) will be also used. These values will be used in searching the index and sub index pages to determine the first leaf page having that low range K1 value and the first occurrence of the K2 value.

It should be noted that the primary key could have many more components, which can be specified by range or fixed value in the query. We have used up to fifty. However, the principles of this invention require only that one be a range and one have a fixed value to operate.

The leaf page indicated is then fetched 52 from the memory to be available to the record-by-record searching routine. The search then proceeds 53. At the end of the search through the records of the leaf page, wherein any record satisfying the search is identified and copied into a results memory, it is time to ask several questions 54. Is the query completed, has the last record having a primary key column value within the specified range for K1 and having a value K2 been found? Another question is has this step been reached because of some internal programming or system or database error? A third question is, is the results page containing sufficient records to match the requirements of the user query? (Typically, a query will return a limited number of answers that fit on a user's screen, and the rest of the search can be done later if the query has not satisfied the user). If the answer to any one of these is yes, the search should be suspended or stopped 55.

If the answer to all these questions is no, we next require a determination 56 of whether a current K1 value has been finished with. Thus, if a record-to-record search has found a next consecutive K1 value (since we are in ascending order records) we know that we have finished with a current value. If the record-by-record search has not found a next consecutive K1 value, the link at the end of the current leaf page is used to identify the address of the next leaf page and a so-called sequential leaf search is accomplished 57. Thus the next sequential leaf page is brought into working memory for the record-by-record search 52 and the process continues.

However, if we have searched past the last record with a current K1 value, we check to see if "swinging" is active 58. Swinging is not activated and thus no leaf pages can be skipped at the start of a search query. If swinging is active, the invention will find the next leaf page meeting the updated K1 value (the next in the range of the query) and the K2 value 62, using the index pages. This is a B Tree search. Where there have been leaf pages skipped 63, we preferably want to know that so that we can identify a time and process savings to the user, although that is not required. We thus send this information to the update and explain statistics block 65 where records of such data are maintained. The routines in the update and explain statistics block are maintained so that we know whether leaf pages were skipped since this explain statistics block and its associated routine will be keeping track of leaf page numbers to provide such determinations for the get next leaf page routine. These values can also be shown to a user or purchaser to indicate the performance enhancement value of this invention or any product embodying it. These statistics can be reported along with search query results if desired or at any other time it seems appropriate.

If no leaf pages were skipped, we deactivate swinging 64, thus saving a call to the B Tree search routine and a review of index pages which may or may not be in main memory, to go to the next sequential leaf page on the next time through the algorithm.

On any subsequent time through step 58, if swinging is inactive, we check the statistics compiled in block 65 to see if it is sensible to activate swinging. Thus, if we have come to the end of a page and have passed the current K1 or K2 value and a next sequential leaf page search did not find any results in that next sequential leaf page a last time through, a count in the update and explain statistics block 65 is incremented 66, and if the number is high enough to meet a predetermined level, the swing activation criteria may not be met (indicated here by the information loop 66).

Activation and deactivation of swinging (or any other routine) can be readily accomplished through various programming steps well known to those or ordinary skill in the arts. For example, a positive value can be stored in a memory location toward deactivating swinging based on some aspect of the decision to not skip leaf pages, and a negative value added to it each time a complementary decision is made to have pages skipped (i.e. to perform the B Tree search). Reference to this value can be used to determine if swinging should be turned on or off. While this value can be a simple semaphore of one or zero value, it seems preferred to use a larger number so that if 2–5 leaf pages are searched and no value found which satisfies the query, the swinging ought to be turned on again, whereas if a mere one page is searched and no result found, it may not be wise to reactivate swinging. This value will depend on the database and the data distribution within it so the 2–5 number is really only a guide.

Another way to characterize a preferred embodiment decision to use swinging or not is this. The on-off mechanism is: WHEN IN AN ACTIVE STATE (i.e., Swinging is available, meaning a B Tree search can be selected)—Did the second search method for retrieving leaf pages skip any leaf pages? (In other words, did it return the right-link or next subsequent leaf page?). WHEN IN AN INACTIVE STATE (i.e., No Swinging)—While searching, count the number of pages that could have been skipped. (i.e., the K1 value is unchanged and no hit record is found. If a new K1 value is found the counter is set back to 0). If the number of pages that would have been skipped exceeds the trapeze fetch activation threshold number, activate swinging (the B Tree search is available as a choice again).

It should also be noted that if the second key value is specified as a range of values by the user search, it is possible to expand the concepts presented here to form a nested structure and search routine such that a first range is used for the first key value and the search is iteratively performed as described above, each iteration assuming for each value of the second key range that there is just one second key value, and then combining the results of all such iterative searches.

The applicants have described a new method and apparatus for performing searches of B Tree and B+ Tree databases having variations and alternative features. Accordingly, the invention is limited only by the following appended claims.

What is claimed is:

1. A search method program implemented on a computer-readable medium for performing a B or B+ Tree search responsive to a user query wherein said user query has a range for a first key value and a definite second key value is also specified in said user query, said program comprising:

a get next leaf page search routine having a comparison element for examining a last record on a leaf page to determine if it has a first key value in said range and a second key value equal to said definite second key value specified in said user query, a decision making element for determining which of two search routines should be used in fetching a next leaf page, said decision making element for generating a search using next sequential leaf page fetch locator signal resident in each leaf page if said first key value of said last record on a leaf page was in said range and said second key value of said last record on a leaf page was equal to said definite second key value, else for generating a signal value indicating a trapeze fetch will be used to find a next leaf page for record searching, a B Tree search routine for searching root and index and data pages for next sequential first key values in said range when said signal value indicates a trapeze fetch will be used, and a fetch routine for generating a page address fetch message sendable to an operating system to fetch said next page, a record searching of a fetched page routine for sequentially searching records within a said fetched next page and for providing records matching each of said sequentially searched records from within a fetched next page to a query response generator routine, said record searching of a fetched page routine having a comparison routine for comparing first and second key values within each record to a current one of said first key values in said range and to said second key value, and, an alternate switch-on-off-trapeze-fetch routine, wherein said alternate switch-on-off-trapeze-fetch routine has:

a recording routine for recording a positive swing value for each time a B Tree search is performed and a selected leaf page resulting from said search is not a same leaf page as a leaf page that would be selected by a sequential leaf search, and for recording a negative swing value each time a B Tree search is performed and a selected leaf page resulting from said search is a same leaf page as a leaf page that would be selected by a sequential leaf search;

a send disable-send enable signal routine for sending a disable B Tree search signal to said decision making element if said swing value reaches a predetermined positive value and for sending an enable B Tree search signal is said on-off value reaches a predetermined negative value, and wherein said decision making element has a disable-enable trapeze fetch routine responsive to said disable B Tree search signal for performing a next sequential leaf fetch each time said decision making element receives said disable B Tree search signal, and responsive to said enable trapeze fetch signal each time said decision making element receives said enable B Tree search signal to enable said B Tree searching.

2. The search method program of claim 1 further comprising a result report generator routine for generating a report including at least a predetermined number of records sent to said query response generator routine for display to a user.

3. The search method program of claim 1 further comprising a result report generator routine for generating a report including at least a predetermined number of records sent to said query response generator routine for use by a user.

4. The search program of claim 1 further comprising explanation generator routine for generating a report with data related to a number of times said B Tree search routine is employed during a said user query.

5. The search program of claim 1 wherein said search fetched page routine searches all records in each said fetched leaf page and returns all records having said second key value, regardless of whether a current first key value is found in said records.

6. A search method program implemented on a computer-readable medium for performing a B or B+ Tree search responsive to a user query wherein said user query has a range for a first key value and a definite second key value is also specified in said user query, said program comprising:
   a net next leaf page search routine having
      a comparison element for examining a last record on a leaf page to determine if it has a first key value in said range and a second key value equal to said definite second key value specified in said user query,
      a decision making element for determining which of two search routines should be used in fetching a next leaf page, said decision making element for generating a search using next sequential leaf page fetch locator signal resident in each leaf page if said first key value of said last record on a leaf page was in said range and said second key value of said last record on a leaf page was equal to said definite second key value, else for generating a signal value indicating a trapeze fetch will be used to find a next leaf page for record searching,
      a B Tree search routine for searching root and index and data pages for next sequential first key values in said range when said signal value indicates a trapeze fetch will be used, and
      a fetch routine for generating a page address fetch message sendable to an operating system to fetch said next page,
      a record searching of a fetched page routine for sequentially searching records within a said fetched next page and for providing records matching each of said sequentially searched records from within a fetched next page to a query response generator routine said record searching of a fetched page routine having a comparison routine for comparing first and second key values within each record to a current one of said first key values in said range and to said second key value, and further comprising two additional routines, a first additional routine for turning off said second search when said second search is active and a second additional routine for turning on said second search when said second search is inactive, said first routine having a disable signaling means to disable said decision-making element from selecting said trapeze fetch routine responsive to a disable signal from said disable signaling means, said disable signaling means for sending a disable signal if said B Tree did not skip any leaf pages when last performed, said second routine having an enable signaling means to enable said decision-making element to select said trapeze fetch if said selection is disabled, said enable signaling means for sending an enable signal when a predetermined number of pages that could have been skipped by said next sequential leaf fetch have been skipped.

7. The search program of claim 6 wherein said predetermined number of pages that could have been skipped by said next sequential leaf fetch is between 1 and 6.

8. The search program of claim 6 wherein said second routine further comprises first element for determining if a current first key value is found in any record on a leaf page, second element for determining if a new first key value in said first key value range is found in any record on a leaf page, and a counter, wherein a count is added if said first element finds no current first key value in a record on a leaf page and wherein the count is reset to its initial value if said second element finds a new first key value in said first key value range on a leaf page, and wherein when said counter reaches a predetermined value, said second routine enable signaling means is activated to send said enable signal.

9. The search program of claim 8 wherein said predetermined value is from 2–5.

* * * * *